(12) United States Patent
Ferraiolo et al.

(10) Patent No.: US 7,590,882 B2
(45) Date of Patent: *Sep. 15, 2009

(54) SYSTEM, METHOD AND STORAGE MEDIUM FOR BUS CALIBRATION IN A MEMORY SUBSYSTEM

(75) Inventors: Frank D. Ferraiolo, New Windsor, NY (US); Kevin C. Gower, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/780,556

(22) Filed: Jul. 20, 2007

(65) Prior Publication Data

US 2008/0040569 A1    Feb. 14, 2008

Related U.S. Application Data

(63) Continuation of application No. 10/977,048, filed on Oct. 29, 2004, now Pat. No. 7,305,574.

(51) Int. Cl.
*G06F 1/12* (2006.01)
*H04L 9/18* (2006.01)

(52) U.S. Cl. .................. 713/600; 713/400; 380/42; 380/268

(58) Field of Classification Search .................. 713/400, 713/500, 600; 380/210, 42, 268
See application file for complete search history.

(56) References Cited

U.S. PATENT DOCUMENTS

| | | |
|---|---|---|
| 2,842,682 A | 7/1958 | Clapper |
| 3,333,253 A | 7/1967 | Sahulka |
| 3,395,400 A | 7/1968 | De Witt |
| 3,825,904 A | 7/1974 | Burk et al. ................ 340/172.5 |
| 4,028,675 A | 6/1977 | Frankenberg ................ 711/106 |
| 4,135,240 A | 1/1979 | Ritchie |
| 4,472,780 A | 9/1984 | Chenoweth et al. |
| 4,475,194 A | 10/1984 | LaVallee et al. ................ 371/10 |
| 4,486,739 A | 12/1984 | Franaszek et al. ........... 340/347 |
| 4,641,263 A | 2/1987 | Perlman et al. |
| 4,654,857 A | 3/1987 | Samson et al. ................. 371/68 |
| 4,723,120 A | 2/1988 | Petty, Jr. ................. 340/825.02 |
| 4,740,916 A | 4/1988 | Martin ....................... 364/900 |
| 4,796,231 A | 1/1989 | Pinkham ................ 365/189.05 |

(Continued)

FOREIGN PATENT DOCUMENTS

| | | |
|---|---|---|
| EP | 0229316 A2 | 7/1987 |
| EP | 0470734 A1 | 2/1992 |
| EP | 1429340 A2 | 6/2004 |
| GB | 2396711 A | 6/2004 |
| JP | 59153353 | 9/1984 |
| JP | 59153353 A | 9/1984 |
| JP | 0432614 | 11/1992 |
| JP | 10011971 | 1/1998 |
| WO | 9621188 | 7/1996 |
| WO | 0223353 A2 | 3/2002 |
| WO | WO2005038660 | 4/2005 |

OTHER PUBLICATIONS

PCT International Search Report PCT/EP2006/068984. Mailed Feb. 16, 2007.

(Continued)

*Primary Examiner*—Thuan N Du
(74) *Attorney, Agent, or Firm*—Cantor Colburn LLP (57) ABSTRACT

A cascaded interconnect system with one or more memory modules, a memory controller and a memory bus that utilizes periodic recalibration. The memory modules and the memory controller are directly interconnected by a packetized multi-transfer interface via the memory bus and provide scrambled data for use in the periodic recalibration.

20 Claims, 11 Drawing Sheets

U.S. PATENT DOCUMENTS

| | | | |
|---|---|---|---|
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | 395/183.06 |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A * | 1/1998 | Katta et al. | 380/217 |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,881,154 A * | 3/1999 | Nohara et al. | 380/42 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Freker et al. | |
| 6,425,044 B1 | 7/2002 | Jeddeloh | |
| 6,446,174 B1 | 9/2002 | Dow | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | 710/71 |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige et al. | |
| 6,590,827 B2 | 7/2003 | Chang et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharachorloo et al. | 711/141 |
| 6,625,687 B1 | 9/2003 | Halber et al. | 711/105 |
| 6,625,702 B2 | 9/2003 | Rentscler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,898,726 B1 | 5/2005 | Lee | |
| 6,910,146 B2 | 6/2005 | Dow | |
| 6,918,068 B2 | 7/2005 | Vail et al. | |

| | | |
|---|---|---|
| 6,938,119 B2 | 8/2005 | Kohn et al. |
| 6,944,084 B2 | 9/2005 | Wilcox |
| 6,948,091 B2 | 9/2005 | Bartels et al. |
| 6,949,950 B2 | 9/2005 | Takahashi et al. |
| 6,965,952 B2 | 11/2005 | Echartea et al. |
| 6,977,536 B2 | 12/2005 | Chin-Chieh et al. ......... 327/116 |
| 6,993,612 B2 | 1/2006 | Porterfield |
| 7,039,755 B1 | 5/2006 | Helms |
| 7,047,371 B2 | 5/2006 | Dortu |
| 7,047,384 B2 | 5/2006 | Bodas et al. |
| 7,076,700 B2 | 7/2006 | Rieger |
| 7,103,792 B2 | 9/2006 | Moon |
| 7,120,743 B2 | 10/2006 | Meyer et al. |
| 7,133,790 B2 | 11/2006 | Liou |
| 7,133,972 B2 | 11/2006 | Jeddeloh |
| 7,155,016 B1 * | 12/2006 | Betts et al. .................. 380/268 |
| 7,177,211 B2 | 2/2007 | Zimmerman ................ 365/201 |
| 7,194,593 B2 | 3/2007 | Schnepper |
| 7,197,594 B2 * | 3/2007 | Raz et al. ..................... 711/103 |
| 7,203,318 B2 * | 4/2007 | Collum et al. .............. 380/278 |
| 7,206,887 B2 | 4/2007 | Jeddeloh |
| 7,206,962 B2 | 4/2007 | Deegan |
| 7,210,059 B2 | 4/2007 | Jeddeloh |
| 7,216,196 B2 | 5/2007 | Jeddeloh |
| 7,227,949 B2 * | 6/2007 | Heegard et al. ................ 380/37 |
| 7,240,145 B2 | 7/2007 | Holman |
| 7,260,685 B2 | 8/2007 | Lee et al. |
| 7,266,634 B2 | 9/2007 | Ware |
| 7,313,583 B2 | 12/2007 | Porten et al. |
| 7,321,979 B2 | 1/2008 | Lee |
| 7,353,316 B2 | 4/2008 | Erdmann |
| 7,363,419 B2 | 4/2008 | Cronin et al. |
| 7,363,436 B1 | 4/2008 | Yeh et al. |
| 7,421,525 B2 | 9/2008 | Polzin et al. |
| 2001/0003839 A1 | 6/2001 | Kondo ......................... 711/144 |
| 2001/0029566 A1 | 10/2001 | Shin |
| 2002/0019926 A1 | 2/2002 | Huppenthal et al. ............ 712/15 |
| 2002/0059439 A1 | 5/2002 | Arroyo et al. |
| 2002/0083255 A1 | 6/2002 | Greeff et al. ................. 710/305 |
| 2002/0103988 A1 | 8/2002 | Dornier ......................... 712/38 |
| 2002/0112119 A1 | 8/2002 | Halbert et al. .............. 711/115 |
| 2002/0112194 A1 | 8/2002 | Uzelac ......................... 713/500 |
| 2002/0124195 A1 | 9/2002 | Nizar ........................... 713/320 |
| 2002/0124201 A1 | 9/2002 | Edwards et al. |
| 2002/0174274 A1 | 11/2002 | Wu et al. ..................... 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. .............. 709/203 |
| 2003/0051055 A1 | 3/2003 | Parrella et al. |
| 2003/0056183 A1 | 3/2003 | Kobayashi |
| 2003/0084309 A1 | 5/2003 | Kohn .......................... 713/189 |
| 2003/0090879 A1 | 5/2003 | Doblar et al. ................ 361/728 |
| 2003/0105938 A1 | 6/2003 | Cooksey et al. |
| 2003/0118044 A1 | 6/2003 | Blanc et al. |
| 2003/0126363 A1 | 7/2003 | David |
| 2003/0223303 A1 | 12/2003 | Lamb et al. ............ 365/230.06 |
| 2003/0236959 A1 | 12/2003 | Johnson et al. ............. 711/167 |
| 2004/0006674 A1 | 1/2004 | Hargis et al. ................ 711/156 |
| 2004/0049723 A1 | 3/2004 | Obara ......................... 714/729 |
| 2004/0098549 A1 | 5/2004 | Dorst |
| 2004/0117588 A1 | 6/2004 | Arimilli et al. .............. 711/203 |
| 2004/0123222 A1 | 6/2004 | Widmer |
| 2004/0128474 A1 | 7/2004 | Vorbach ....................... 712/10 |
| 2004/0148482 A1 | 7/2004 | Grundy et al. |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. ................. 710/22 |
| 2004/0246767 A1 | 12/2004 | Vogt ........................... 365/154 |
| 2004/0250153 A1 | 12/2004 | Vogt ........................... 713/500 |
| 2004/0260909 A1 | 12/2004 | Lee et al. ..................... 711/213 |
| 2004/0260957 A1 | 12/2004 | Jeddeloh et al. ............. 713/300 |

| | | |
|---|---|---|
| 2005/0023560 A1 | 2/2005 | Ahn et al. ..................... 257/200 |
| 2005/0033906 A1 | 2/2005 | Mastronarde et al. |
| 2005/0044305 A1 | 2/2005 | Jakobs et al. |
| 2005/0050237 A1 | 3/2005 | Jeddeloh et al. ................ 710/10 |
| 2005/0050255 A1 | 3/2005 | Jeddeloh ..................... 710/317 |
| 2005/0066136 A1 | 3/2005 | Schnepper ................... 711/154 |
| 2005/0071542 A1 | 3/2005 | Weber et al. |
| 2005/0080581 A1 | 4/2005 | Zimmerman et al. ........ 702/117 |
| 2005/0081129 A1 | 4/2005 | Shah et al. |
| 2005/0086441 A1 | 4/2005 | Myer et al. |
| 2005/0097249 A1 | 5/2005 | Oberlin et al. |
| 2005/0120157 A1 | 6/2005 | Chen et al. ................... 710/313 |
| 2005/0125702 A1 | 6/2005 | Huang et al. ................ 713/320 |
| 2005/0125703 A1 | 6/2005 | Lefurgy et al. .............. 713/320 |
| 2005/0138246 A1 | 6/2005 | Chen et al. |
| 2005/0138267 A1 | 6/2005 | Bains et al. .................. 711/100 |
| 2005/0144399 A1 | 6/2005 | Hosomi ....................... 711/145 |
| 2005/0149665 A1 | 7/2005 | Wolrich et al. |
| 2005/0166006 A1 | 7/2005 | Talbot |
| 2005/0177677 A1 | 8/2005 | Jeddeloh |
| 2005/0177690 A1 | 8/2005 | LaBerge ..................... 711/154 |
| 2005/0204216 A1 | 9/2005 | Daily et al. ................. 714/724 |
| 2005/0216678 A1 | 9/2005 | Jeddeloh |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh et al. |
| 2005/0259496 A1 | 11/2005 | Hsu et al. .................... 365/226 |
| 2005/0289377 A1 | 12/2005 | Luong |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0107175 A1 | 5/2006 | Dell et al. |
| 2006/0112238 A1 | 5/2006 | Jamil et al. |
| 2006/0161733 A1 | 7/2006 | Beckett et al. |
| 2006/0195631 A1 | 8/2006 | Rajamani |
| 2006/0288172 A1 | 12/2006 | Lee et al. |
| 2007/0005922 A1 | 1/2007 | Swaminathan et al. |
| 2007/0025304 A1 | 2/2007 | Leelahakriengkrai et al. |
| 2007/0038907 A1 | 2/2007 | Jeddeloh et al. |
| 2007/0160053 A1 | 7/2007 | Coteus |

OTHER PUBLICATIONS

PCT International Search Report PCT/EP2007/057916. Mailed Dec. 14, 2007.

Benini, et al., "System-Level Powers Optimization: Techniques and Tools", ACM Transactions on Design Automation of Electronic Systems, vol. 5, No. 2, Apr. 2000, pp. 115-192.

Boudon, et al., "Novel Bus Reconfiguration Scheme With Spare Lines", IBM Technical Disclosure Bulletin, May 1987, vol. 29, No. 12, pp. 1-3.

Brown, et al "Compiler-Based I/O Prefetching for Out-of-Core Applications", ACM Transactions on Computer Systems, vol. 19, No. 2, May 2001, pp. 111-170.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

IEEE, "IEEE Standard Test Access Port and Boundary-Scan Architecture", Jul. 23, 2001, IEEE Std 1149-1-2001, pp. 11-13.

JEDEC Solid State Technology Association, "JEDEC Standard: DDR2 SDRAM Specification", Jan. 2004, JEDEC, Revision JESD79-2A, p. 10.

Jungjoon Kim et al.; "Performance and Architecture Features of Segmented Multiple Bus System;" IEEE Computer Society; 1999 International Conference on Parallel Processing (ICPP '99).

Massoud Pedram, "Power Minimization in IC Design Principles and Applications", ACM Transactions on Design Automation of Electronic Systems vol. 1, No. 1, Jan. 1996, pp. 3-56.

Natarajan, et al., "A Study of Performance Impact of Memory Controller Features in Multi-Processor Server Environment", pp. 80-87. NB940259 (IBM Technical Disclosure Bulletin, Feb. 1994; vol. 37; pp. 59-64).

Nilsen, "High-Level Dynamic Memory Management for Object-Oriented Real-Time Systems", pp. 86-93.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online]; [retrieved on Feb. 23, 2006]; retrieved from the Internet.

Rosenberg, "Dictionary of Computers, Information Processing & Telecommuications", Second Edition, John Wiley & Sons, Inc. 1987. 3 pgs.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

U.S. Appl. No. 11/419,586 filed May 22, 2006. Robert Tremaine. "Systems and Methods for Providing Remote Pre-Fetch Buffers".

Wang, et al., "Guided Region Prefetching: A Cooperative Hardware/Software Approach", pp. 388-398.

Wikipedia, Serial Communications, [online], [retrieved Apr. 10, 2007 from the Internet], http://en.wikipedia.org/wiki/Serial_communications,page 1.

PCT Search Report. PCT/EP2007/057915. Mailed Nov. 7, 2007.

International Search Report, International Application No. PCT/EP2007/054929, International Publication No. WO 2007/135144 A1, received Mar. 21, 2008.

Joe Jeddeloh, Fully Buffered DIMM (FB-DIMM), XP002490174, Advanced Systems Technology, Micron Technology, Inc. Apr. 16, 2008, 23 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 1, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837, mailed Oct. 7, 2008, 5 pages.

* cited by examiner

SYSTEM, METHOD AND STORAGE MEDIUM FOR BUS CALIBRATION IN A MEMORY SUBSYSTEM

CROSS REFERENCE TO RELATED APPLICATIONS

This application is a continuation application of U.S. Ser. No. 10/977,048, filed Oct. 29, 2004, the contents of which are incorporated by reference herein in their entirety.

BACKGROUND OF THE INVENTION

The invention relates to a memory subsystem and in particular, to bus calibration in a memory subsystem.

Figure 1:
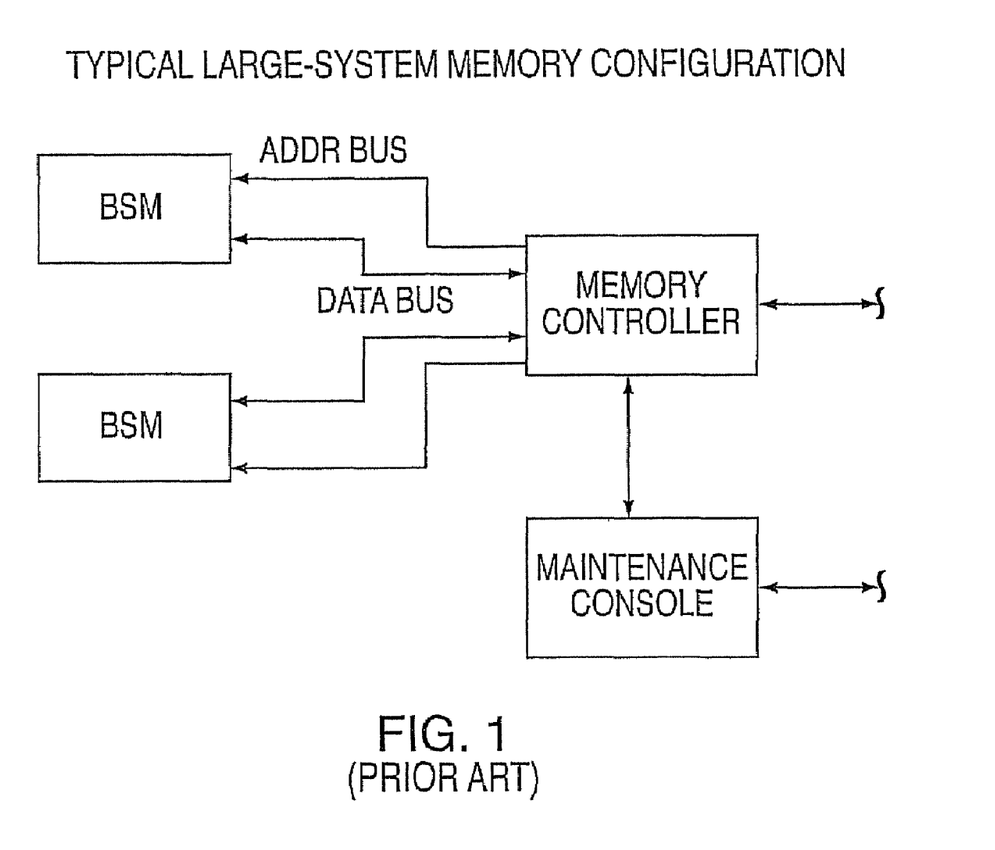
FIG. 1 depicts a prior art memory controller connected to two buffered memory assemblies via separate point-to-point links.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

Figure 2:
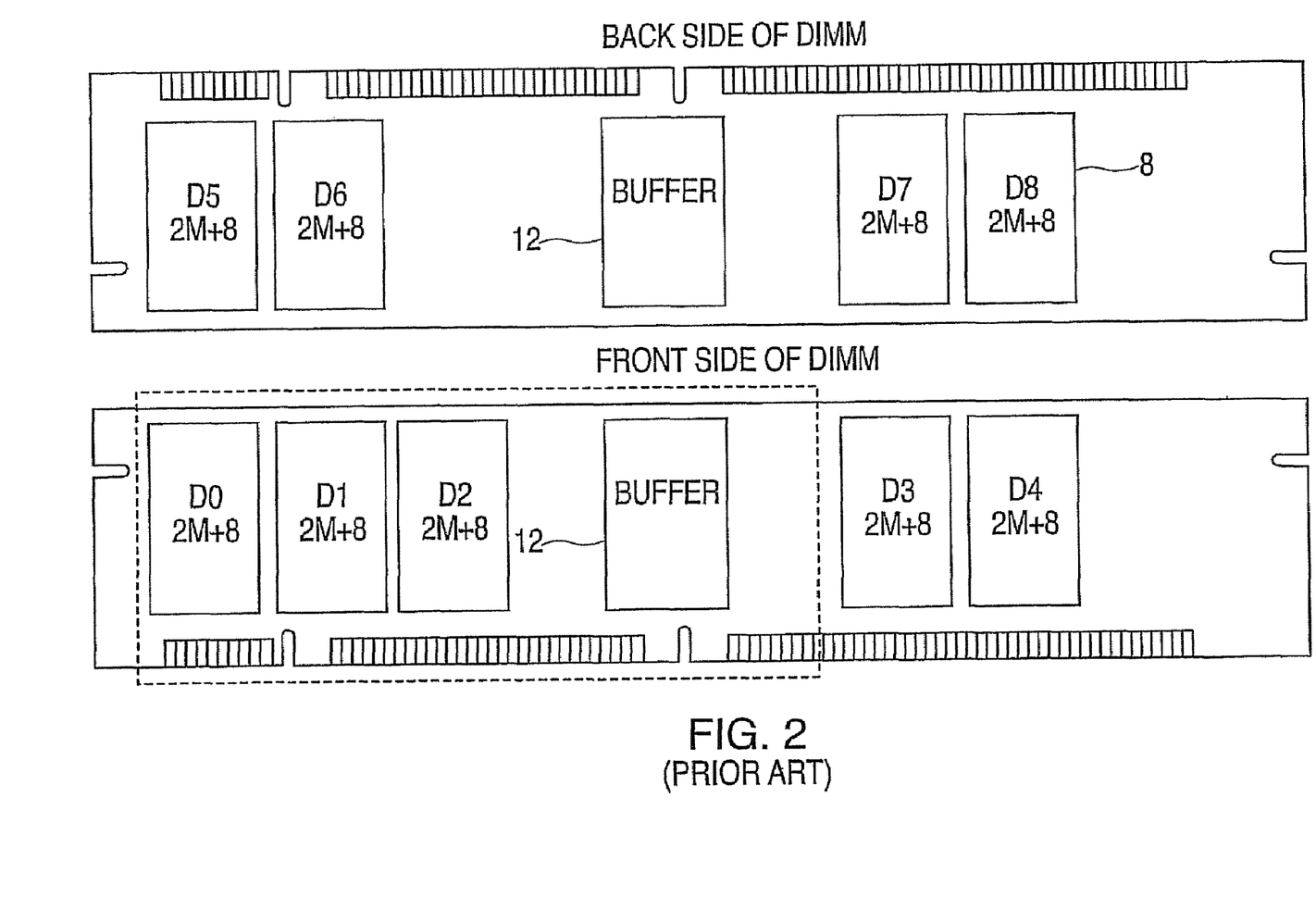
FIG. 2 depicts a prior art synchronous memory module with a buffer device.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

Figure 3:
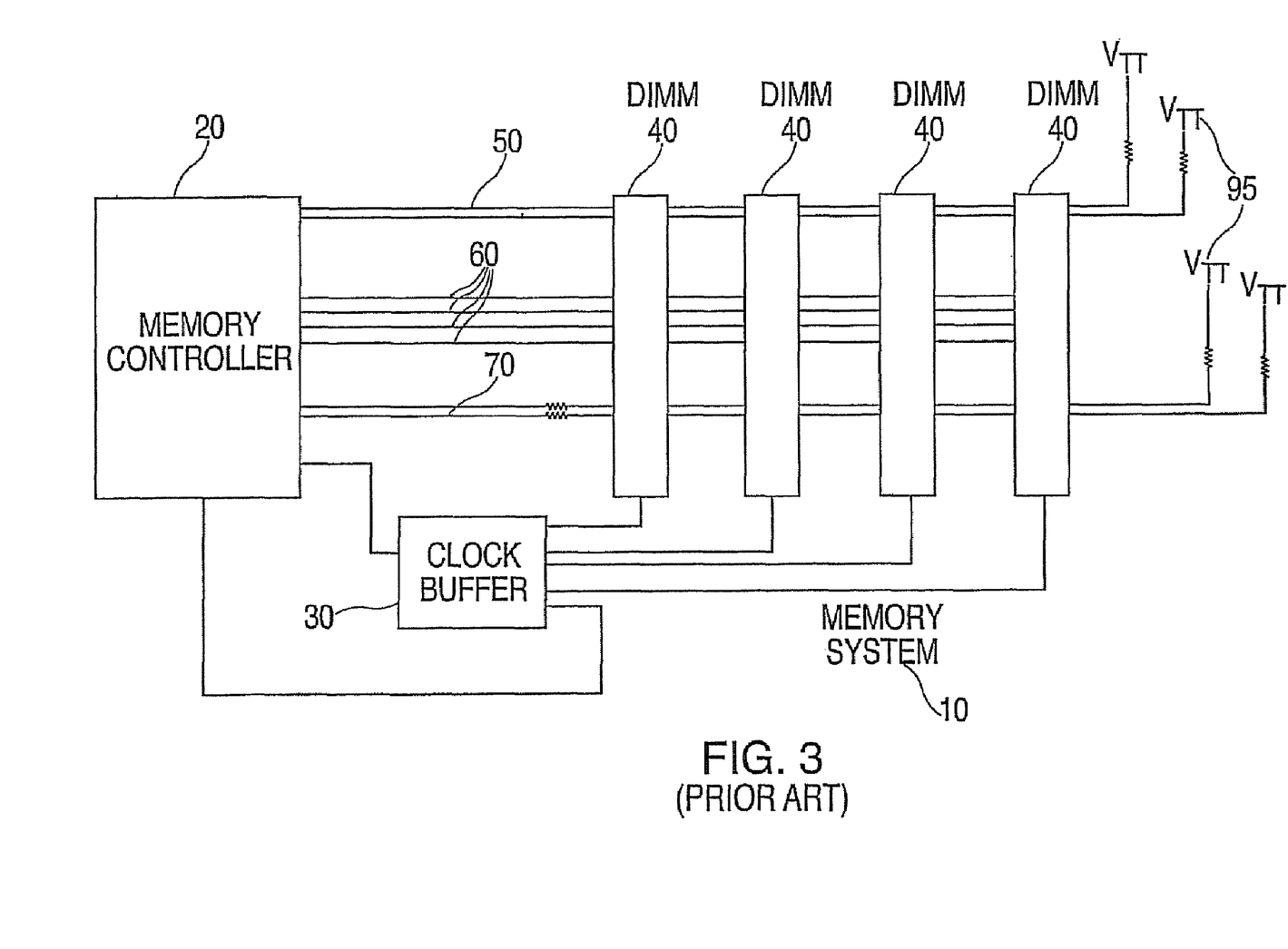
FIG. 3 depicts a prior art memory subsystem using registered DIMMs.

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and data bus 70.

Figure 4:
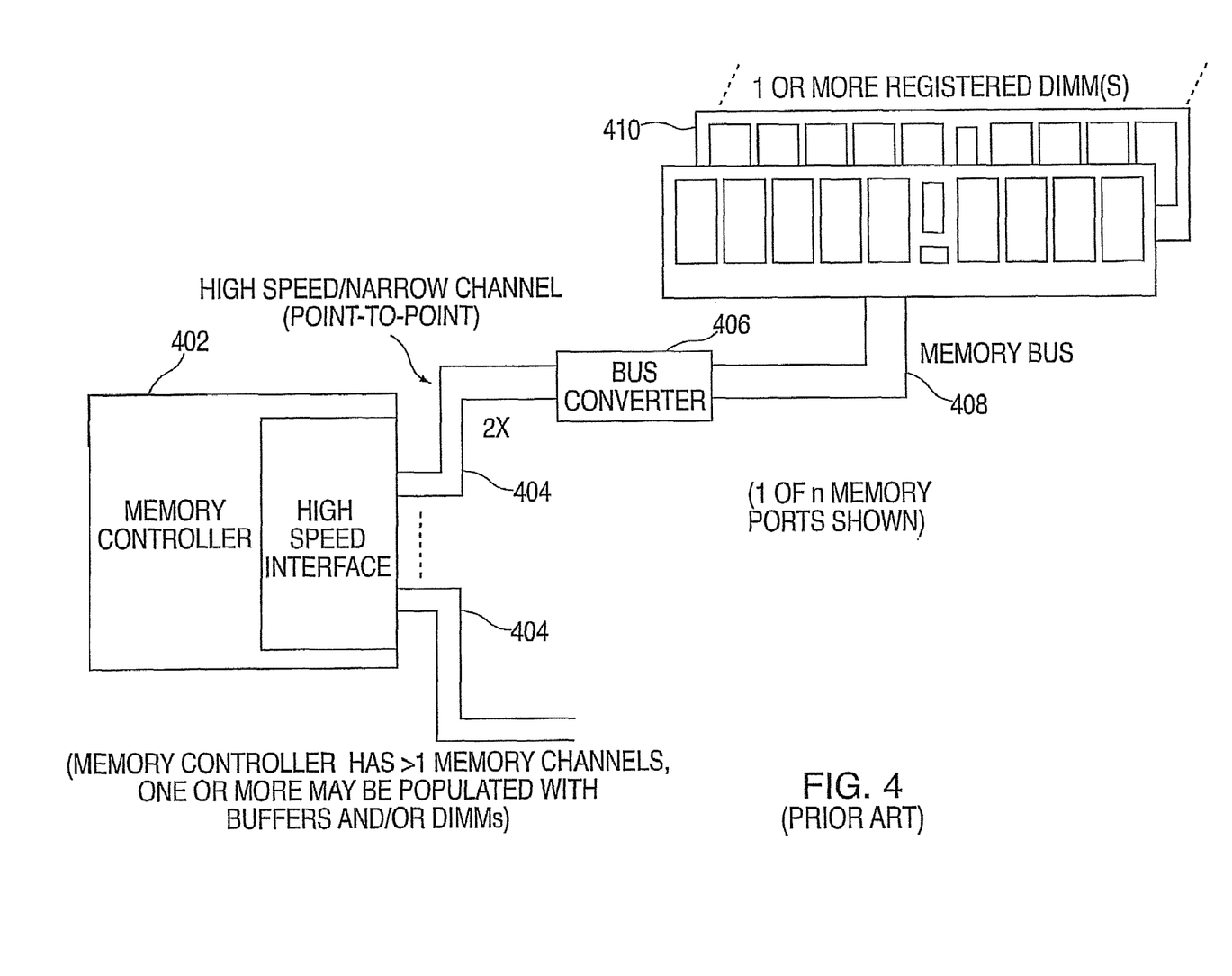
FIG. 4 depicts a prior art memory subsystem with point-to-point channels, registered DIMMs, and a 2:1 bus speed multiplier.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EEPROM) and terminators, in addition to other passive components.

Figure 5:
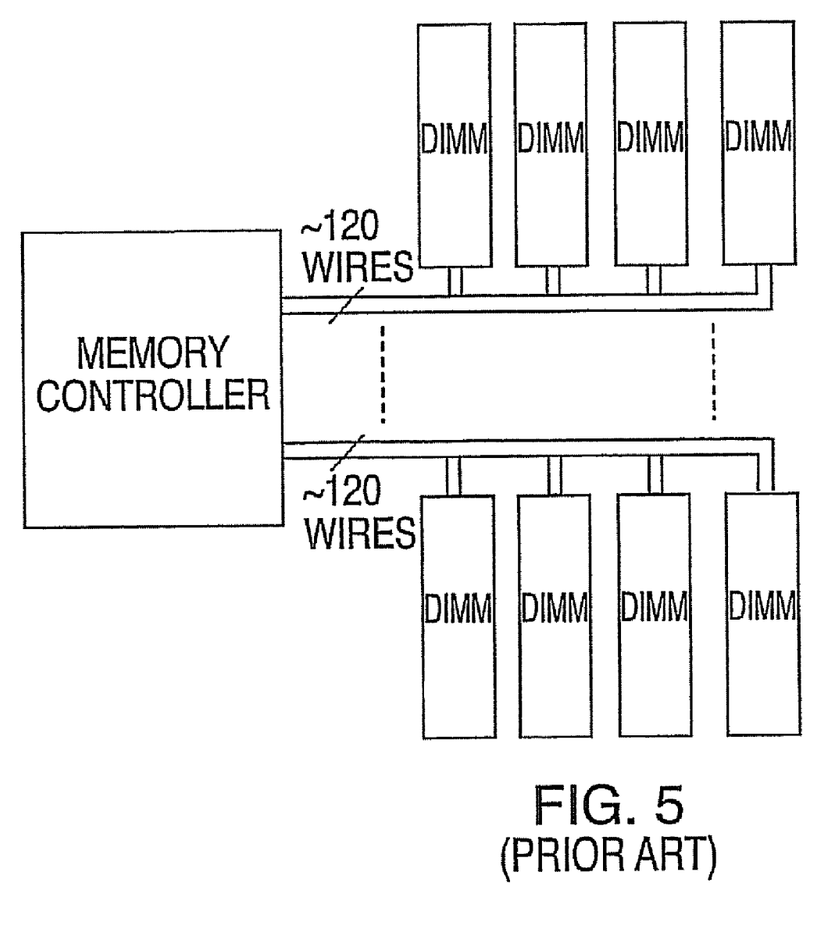
FIG. 5 depicts a prior art memory structure that utilizes a multidrop memory 'stub' bus.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

Figure 6:
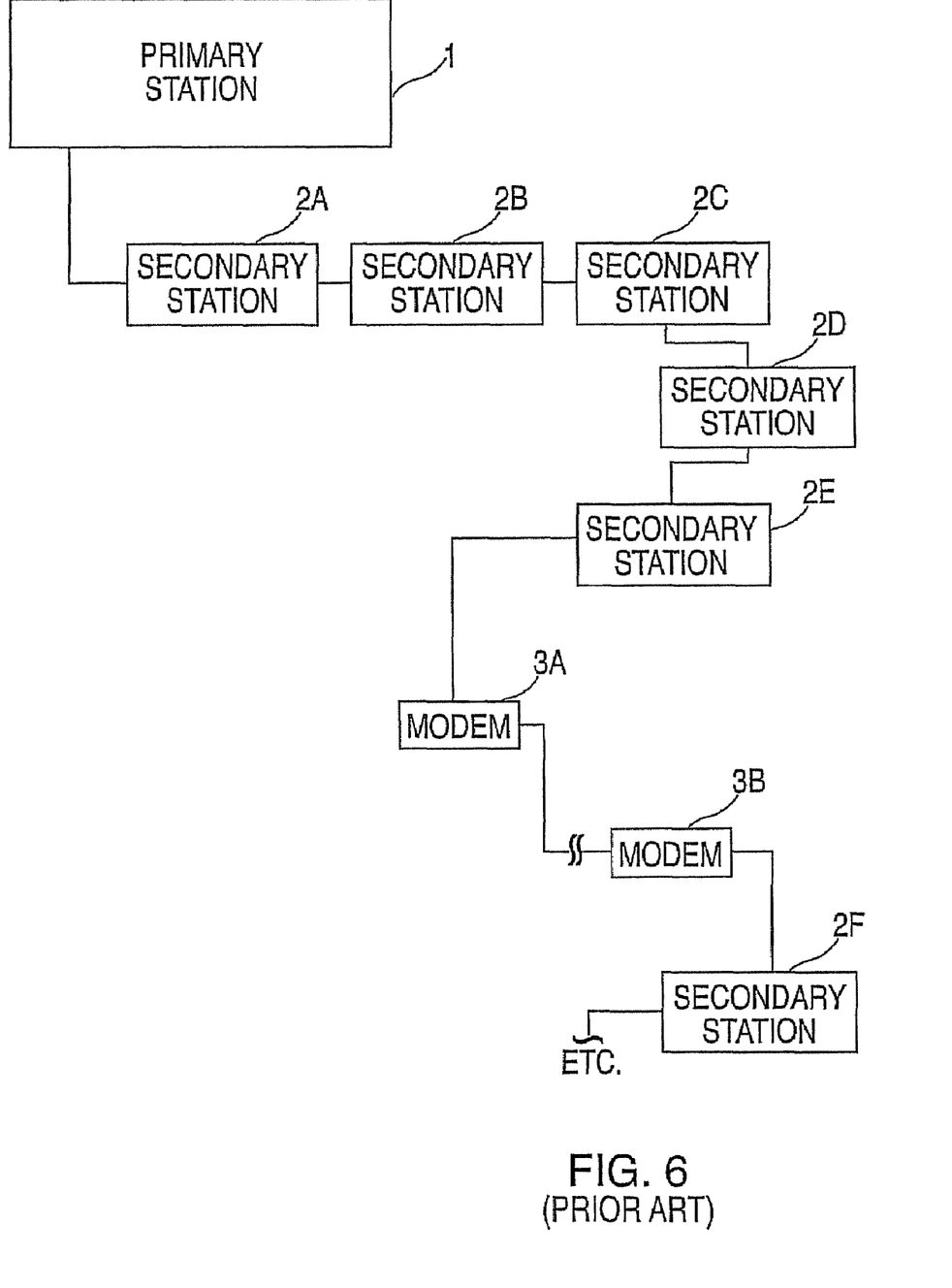
FIG. 6 depicts a prior art daisy chain structure in a multipoint communication structure that would otherwise require multiple ports.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

Figure 7:
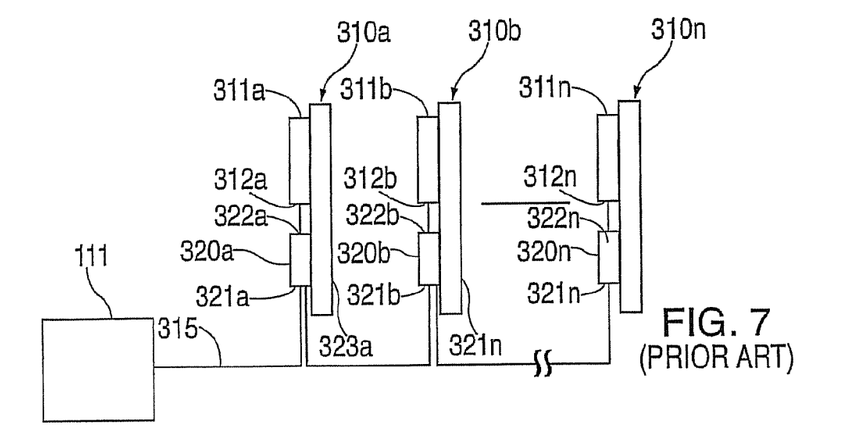
FIG. 7 depicts a prior art daisy chain connection between a memory controller and memory modules.

FIG. 7 represents a daisy chained memory bus, implemented consistent with the teachings in U.S. Pat. No. 4,723,120. A memory controller 111 is connected to a memory bus 315, which further connects to a module 310a. The information on bus 315 is re-driven by the buffer on module 310a to the next module, 310b, which further re-drives the bus 315 to module positions denoted as 310n. Each module 310a includes a DRAM 311a and a buffer 320a. The bus 315 may be described as having a daisy chain structure, with each bus being point-to-point in nature.

Figure 8:
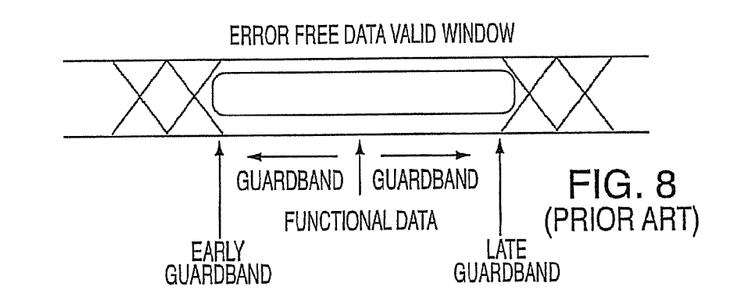
FIG. 8 depicts a prior art data sampling schematic.

In chip to chip (e.g., controller to module, module to module) communication, it is common place to design receive side circuits and/or logic to aid in the sampling of the incoming data to improve the performance of the interface. Typically the circuitry senses transitions on the incoming data. Based on the position or phase arrival of the data transitions, an algorithm determines the optimum phase of the clock to sample the incoming data. See FIG. 8, where the clock is centered between two consecutive edges of data. The guardbands are used to sense and to equally center the clock within the data transitions. Designers may use a phased loop lock (PLL), a delay locked loop (DLL) or various other closed loop techniques to determine and then to set the optimal phase of the sampling clock. Without transitions on the incoming data, there is no information to sense or to base a relative comparison of the sampling clock to the incoming data. If long periods of time elapse without transitions on data, the sampling clock may drift with changes in temperature or power supply, thus increasing the sampling error and decreasing the performance of the interface.

In order to ensure that there is some minimum transition density within the data, designers often code the data. The 8/10 code is a well known code that encodes an eight bit data stream into ten bits to ensure transitions always exist on data. However, the impact on bandwidth is twenty percent because what would normally take eight bit times to transfer the required information now takes ten bits with the overhead of the coding function. An alternative to coding is to periodically interrupt data transfers and to send a known pattern(s). Although the impact on bandwidth may be much smaller than with the coding alternative, this approach also has its drawbacks since the system operation must be halted before the special patterns can be transmitted.

BRIEF SUMMARY OF THE INVENTION

Exemplary embodiments of the present invention include a cascaded interconnect system with one or more memory modules, a memory controller and a memory bus. The memory bus utilizes periodic recalibration. The memory modules and the memory controller are directly interconnected by a packetized multi-transfer interface via the memory bus and provide scrambled data for use in the periodic recalibration.

Additional exemplary embodiments include a method for providing periodic recalibration of a memory bus in a cascaded interconnect memory system. The method includes receiving input data at a transmit side, where the transmit side includes a memory controller or a memory module within the memory system. The input data is scrambled at the transmit side, resulting in scrambled data for use in the periodic recalibration of the memory bus. The scrambled data is transmitted to a receive side via the memory bus, where the receive side includes a memory controller or a memory module directly connected to the transmit side by a packetized multi-transfer interface via the memory bus. A sampling clock and a data phase of the scrambled data is periodically synchronized at the receive side for data sampling on the memory bus. The scrambled data is de-scrambled at the receive side, resulting in the original input data.

Further exemplary embodiments include a storage medium with machine readable computer program code for providing periodic bus recalibration of a memory bus in a cascaded interconnect memory subsystem. The storage medium includes instructions for causing a computer to implement a method. The method includes receiving input data at a transmit side, where the transmit side includes a memory controller or a memory module within the memory system. The input data is scrambled at the transmit side, resulting in scrambled data for use in the periodic recalibration of the memory bus. The scrambled data is transmitted to a receive side via the memory bus, where the receive side includes a memory controller or a memory module directly connected to the transmit side by a packetized multi-transfer interface via the memory bus. A sampling clock and a data phase of the scrambled data is periodically synchronized at the receive side for data sampling on the memory bus. The scrambled data is de-scrambled at the receive side, resulting in the original input data.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide scrambled data for use in calibrating busses in a memory subsystem. Data being transferred across wires within the memory subsystem are scrambled at a transmitting memory module or controller before being transferred and then de-scrambled at a receiving memory module or controller. Data bits are scrambled by mixing the data bits with a known pattern to reduce the likelihood that the data will not switch (i.e., go from a one to a zero or from a zero to a one) within a particular number of bits (e.g., sixty-four). As described previously, transitions on the wire are used for determining an optimum phase of a clock for data sampling on the wire.

Scrambling minimizes the likelihood that the data will not switch, and it does this without impacting bandwidth or requiring system operation to be halted. When using a sixty-four bit scrambling pattern, the chance of the exact inverse pattern of raw data being transmitted (and therefore no transitions in the data after it is scrambled), is approximately two to the sixty-fourth power. Over a longer period of time (e.g., after thousands of bits are transmitted) the likelihood of no data transitions on the transmitted (i.e., scrambled) data stream approaches zero. Another advantage of the scrambling approach is that the logic and additional latency required to implement scrambling is relatively small.

Figure 9:
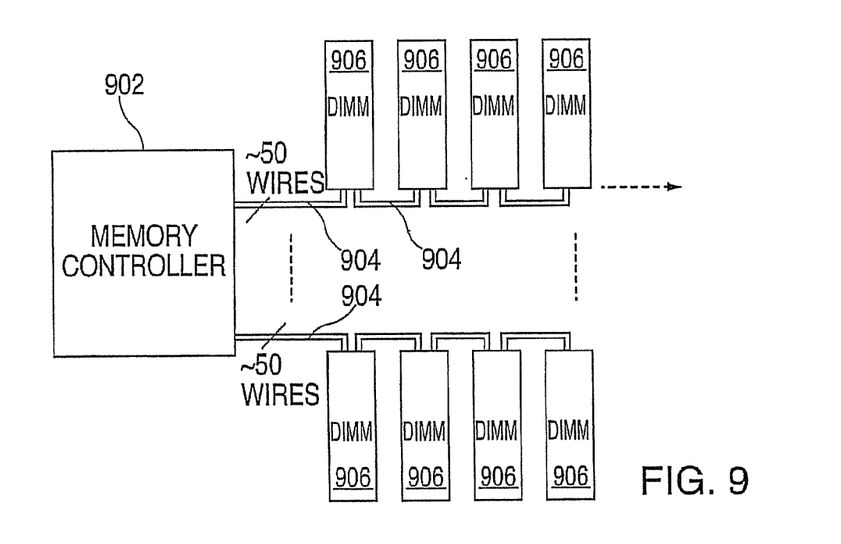
FIG. 9 depicts a cascaded memory structure that is utilized by exemplary embodiments of the present invention.

FIG. 9 depicts a cascaded memory structure that may be utilized by exemplary embodiments of the present invention. This memory structure includes a memory controller 902 in communication with one or more memory modules 906 via a high speed point-to-point bus 904. Each bus 904 in the exemplary embodiment depicted in FIG. 9 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. In an exemplary embodiment of the present invention, the memory controller 902 and memory modules 906 include or have access to scrambling and de-scrambling logic and/or circuitry. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 9, provides a four to one bus speed ratio to maximize bus efficiency and to minimize pincount.

Although point-to-point interconnects permit higher data rates, overall memory subsystem efficiency must be achieved by maintaining a reasonable number of memory modules 906 and memory devices per channel (historically four memory modules with four to thirty-six chips per memory module, but as high as eight memory modules per channel and as few as one memory module per channel). Using a point-to-point bus necessitates a bus re-drive function on each memory module. The bus re-drive function permits memory modules to be cascaded such that each memory module is interconnected to other memory modules, as well as to the memory controller 902.

Figure 10:
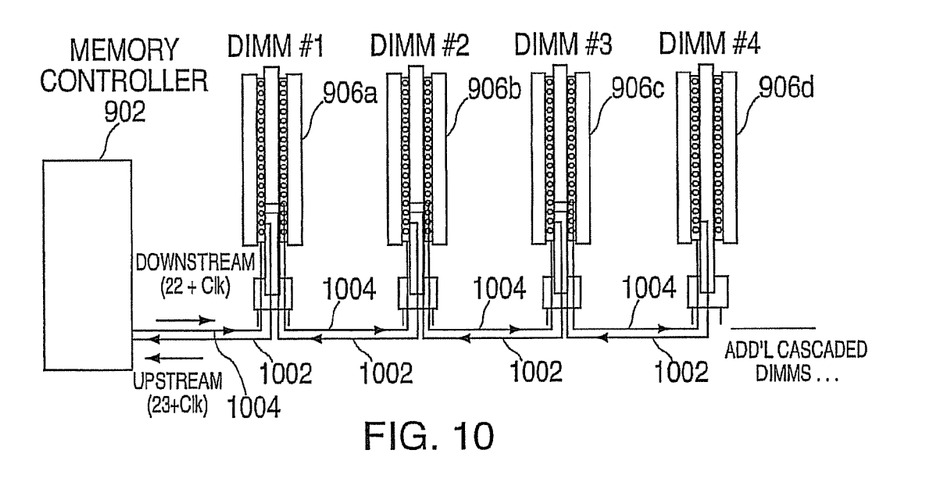
FIG. 10 depicts a memory structure with cascaded memory modules and unidirectional busses that is utilized by exemplary embodiments of the present invention.

FIG. 10 depicts a memory structure with cascaded memory modules and unidirectional busses that is utilized by exemplary embodiments of the present invention. One of the functions provided by the memory modules 906 in the cascade structure is a re-drive function to send signals on the memory bus to other memory modules 906 or to the memory controller 902. FIG. 10 includes the memory controller 902 and four memory modules 906a, 906b, 906c and 906d, on each of two memory busses (a downstream memory bus 1004 and an upstream memory bus 1002), connected to the memory controller 902 in either a direct or cascaded manner. Memory module 906a is connected to the memory controller 902 in a direct manner. Memory modules 906b, 906c and 906d are connected to the controller 902 in a cascaded manner.

An exemplary embodiment of the present invention includes two uni-directional busses between the memory controller 902 and memory module 906a ("DIMM #1"), as well as between each successive memory module 906b-d ("DIMM #2", "DIMM #3" and "DIMM #4") in the cascaded memory structure. The downstream memory bus 1004 is comprised of twenty-two single-ended signals and a differential clock pair. The downstream memory bus 1004 is used to transfer address, control, write data and bus-level error code correction (ECC) bits downstream from the memory controller 902, over several clock cycles, to one or more of the memory modules 906 installed on the cascaded memory channel. The upstream memory bus 1002 is comprised of twenty-three single-ended signals and a differential clock pair, and is used to transfer read data and bus-level ECC bits upstream from the sourcing memory module 906 to the memory controller 902. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 902 signal pincount, per memory channel, is reduced from approximately one hundred and twenty pins to about fifty pins.

Figure 11:
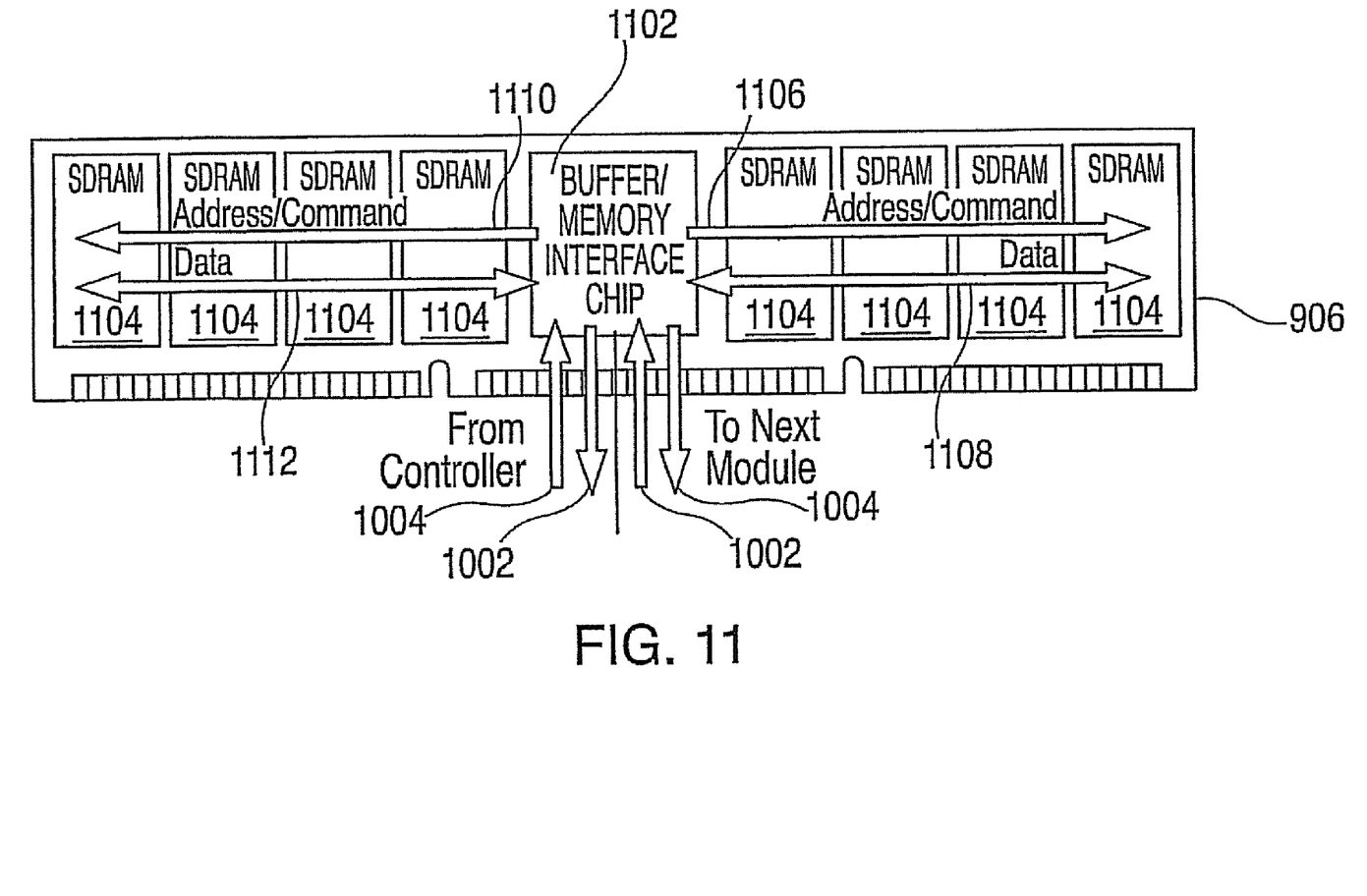
FIG. 11 depicts a buffered module wiring system that is utilized by exemplary embodiments of the present invention.

FIG. 11 depicts a buffered module wiring system that is utilized by exemplary embodiments of the present invention. FIG. 11 is a pictorial representation of a memory module, with shaded arrows representing the primary signal flows. The signal flows include the upstream memory bus 1002, the downstream memory bus 1004, memory device address and command busses 1110 and 1106, and memory device data busses 1112 and 1108. In an exemplary embodiment of the present invention, a buffer device 1102, also referred to as a memory interface chip, provides two copies of the address and command signals to SDRAMs 1104 with the right memory device address and command bus 1106 exiting from the right side of the buffer device 1102 for the SDRAMs 1104 located to the right side and behind the buffer device 1102 on the right. The left memory device address and command bus 1110 exits from the left side of the buffer device 1102 and connects to the SDRAMs 1104 to the left side and behind the buffer device 1102 on the left. Similarly, the data bits intended for SDRAMs 1104 to the right of the buffer device 1102 exit from the right of the buffer device 1102 on the right memory device data bus 1108. The data bits intended for the left side of the buffer device 1102 exit from the left of the buffer device 1102 on the left memory device data bus 1112. The high speed upstream memory bus 1002 and downstream memory bus 1004 exit from the lower portion of the buffer device 1102, and connect to a memory controller or other memory modules either upstream or downstream of this memory module 906, depending on the application. The buffer device 1102 receives signals that are four times the memory module data rate and converts them into signals at the memory module data rate.

The memory controller 902 interfaces to the memory modules 906 via a pair of high speed busses (or channels). The downstream memory bus 1004 (outbound from the memory controller 902) interface has twenty-four pins and the upstream memory bus 1002 (inbound to the memory controller 902) interface has twenty-five pins. The high speed channels each include a clock pair (differential), a spare bit lane, ECC syndrome bits and the remainder of the bits pass information (based on the operation underway). Due to the cascaded memory structure, all nets are point-to-point, allowing reliable high-speed communication that is independent of the number of memory modules 906 installed. For each wire within a segment of the downstream memory bus 1004 and each wire within a segment of the upstream memory bus 1002 scrambling logic and/or circuitry at a sending end and de-scrambling logic and/or circuitry at a receiving end is applied. Whenever a memory module 906 receives a packet on either bus, it re-synchronizes the command to the internal clock and re-drives (including scrambling) the command to the next memory module 906 in the chain (if one exists).

Figure 12:
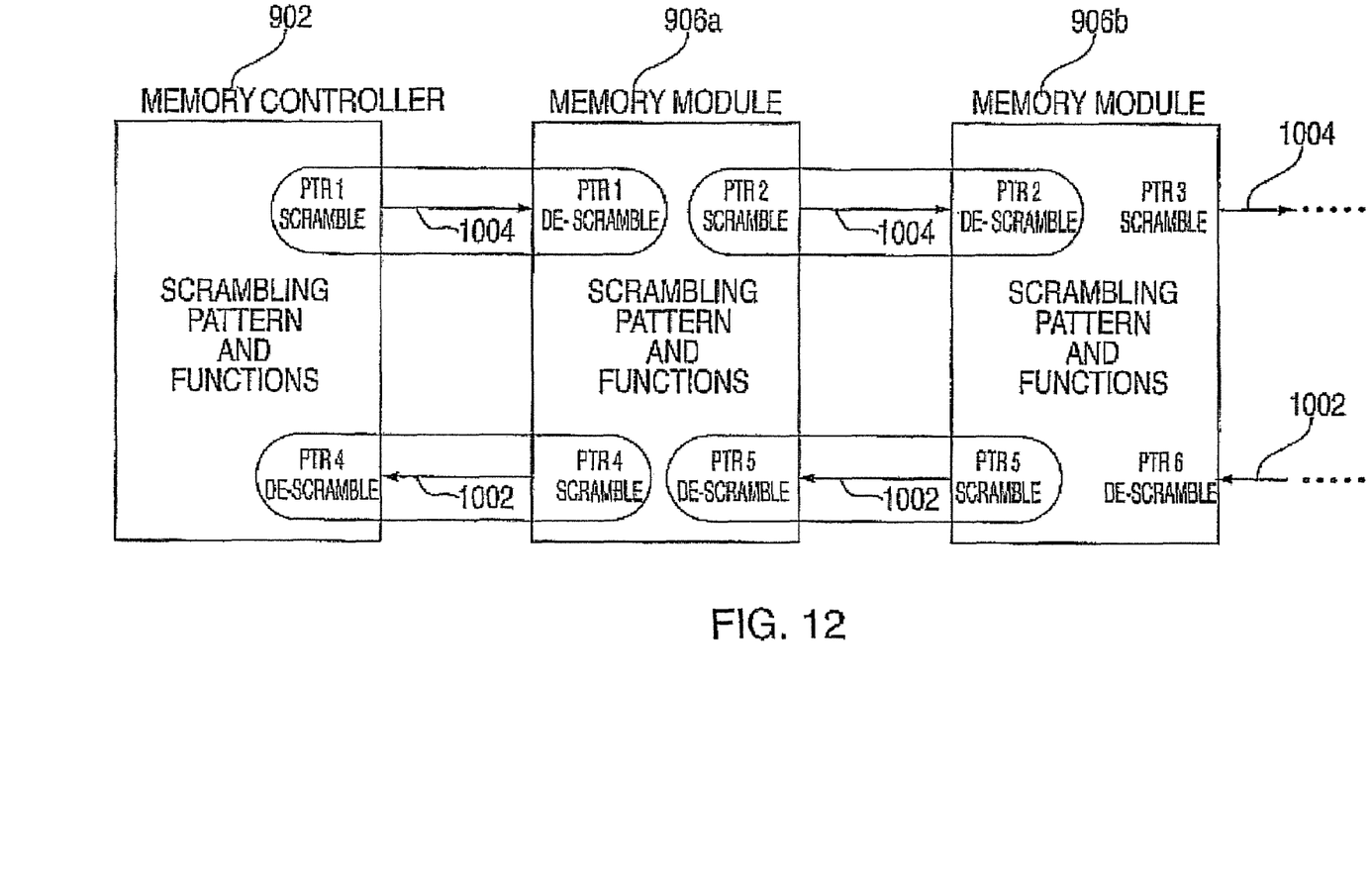
FIG. 12 depicts a memory subsystem that is utilized by exemplary embodiments of the present invention.

FIG. 12 depicts a memory subsystem that is utilized by exemplary embodiments of the present invention. As shown in FIG. 12, the memory controller 902 and memory modules 906 include a scrambling pattern and scrambling functions that may be implemented by hardware circuitry and/or software logic. Scrambling functions include data scrambling and data de-scrambling, as well as keeping track of one or more pointers for determining a current placement within the scrambling pattern. In an exemplary embodiment of the present invention, the scrambling and de-scrambling functions are performed in the same manner (e.g., with the same logic and with the same circuitry). One pointer is maintained for each scramble/de-scramble pair in order to synchronize the correct location in the scrambling pattern to be utilized for the scrambling/de-scrambling.

For example, the memory controller 902 and memory module 906a in FIG. 12 include "pointer 1". When the memory controller 902 scrambles data to be sent to memory module 906a, the memory controller uses "pointer 1" to index into the scrambling pattern to point to the bit in the scrambling pattern that is being utilized for scrambling/de-scrambling. If the value of "pointer 1" at the memory controller 902 is five for the first bit being scrambled, then the value of "pointer 1" must be five at memory module 906a when the first bit is de-scrambled in order to ensure that the correct bit within the scrambling pattern is being utilized to de-scramble the first bit from the memory controller 902 (i.e., the input data). The pointers may be synchronized at memory subsystem initialization and then re-initialized as deemed required. The second bit would be scrambled and de-scrambled using a pointer value of six, the third bit would be scrambled using a pointer value of seven, etc. The de-scrambling process on the receive side returns the raw transmitted data back to its original values. Hence, the scrambling process is transparent to both ends of the link. Other methods of synchronizing the scrambling pattern between the transmit side and receive side may be utilized by alternate exemplary embodiments of the present invention to ensure that the same values within the scrambling pattern are being utilized to perform the scrambling and the corresponding de-scrambling.

In exemplary embodiments of the present invention, the pattern used to scramble the data (i.e., the scrambling pattern) is a predetermined value stored in a sixty-four bit register. The pattern is replicated on both sides of the link. In an exemplary embodiment of the present invention, the scrambling pattern is the same for all components (i.e., memory controller 902 and memory modules 906) within the memory subsystem. In alternate exemplary embodiment of the present invention the scrambling patterns may be different between different pairs of pointers within the memory subsystem.

Figure 13:
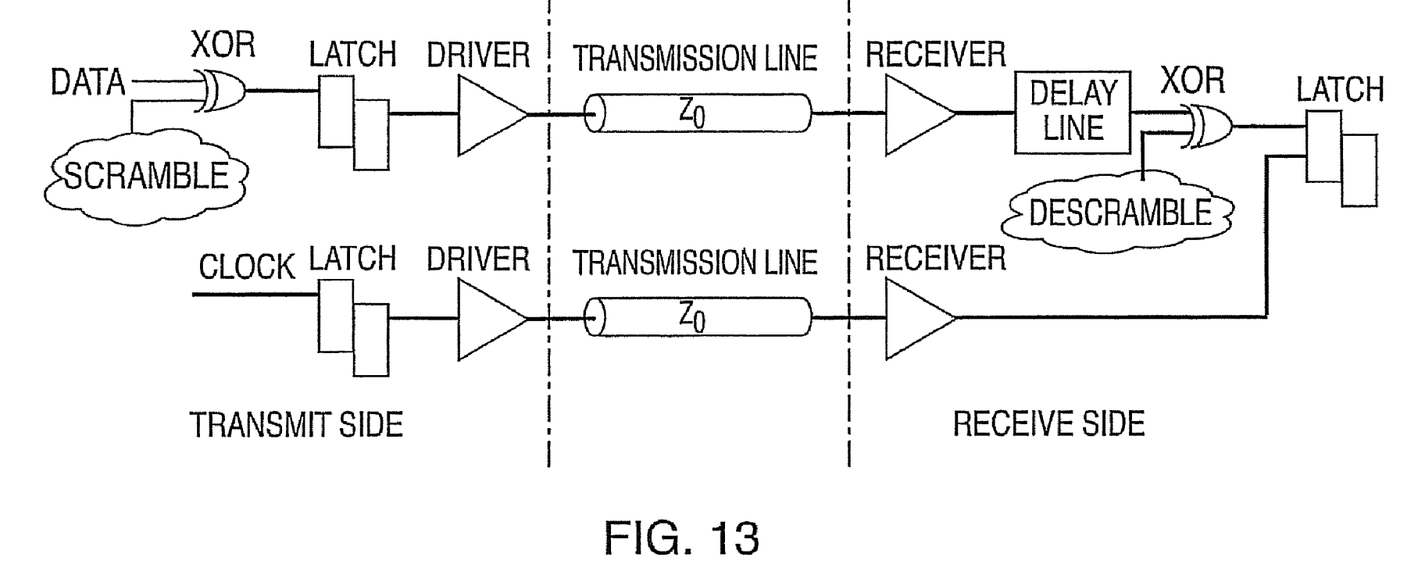
FIG. 13 depicts exemplary circuitry for providing bus calibration in accordance with exemplary embodiments of the present invention.

FIG. 13 depicts exemplary circuitry for providing bus calibration in accordance with exemplary embodiments of the present invention. The circuitry depicted in FIG. 13 is replicated for each of the twenty-three wires on the upstream memory bus 1002 and for each of the twenty-two wires on the downstream memory bus 1004. As shown in FIG. 13, an exclusive-or (XOR) gate is used to mix the scrambling pattern with the raw data to be transmitted. The transmit side scrambles the data and the receive side de-scrambles the data. The sampling clock and data phase for the data received on the bus are synchronized to improve the sampling of the data. In the exemplary embodiment depicted in FIG. 13, the delay line shown on the receive side is utilized to manipulate the phase of the incoming data to synchronize the clock with the incoming data and is part of the receive side clock to data optimization closed loop. In alternate exemplary embodiments of the present invention, the sampling clock and/or data phase are manipulated to perform the synchronizing. The de-scrambling circuit needs to be operated in synchronization with the transmit sequence, i.e., scramble bit number one on the transmit side must be correctly matched to de-scramble bit number one on the receive side. This may be accomplished at power on with an initialization sequence. Portions of the circuitry and/or logic may be located within the memory bus and/or within the memory modules 906 and the memory controller 902.

In an exemplary embodiment of the present invention, one property of the initialization sequence is that it is unique once every sixty-four bits (i.e., a logic one followed by sixty-three zeros). Initially, the scrambling functions (including setting the pointers) are inhibited while the initialization sequence is transmitted but the scrambling pointers are reset to count in synchronization with the initialization sequence. On the receive side, the single logic one in the initialization sequence is decoded and identified. The de-scrambling pointer on the receive side is then reset and synchronized with the initialization pattern. After initialization is complete, the scrambling/de-scrambling functions can be activated. The scrambling pattern may take on many forms; below is a sixty-three bit pattern that was generated from a sixth order pseudo random binary sequence (PRBS) generator:

1010_1011_0011_0111_0110_1001_0011_1000_1011_1100_1010_0011_0000_1000_0011_1111.

A maximal length polynomial, $p(x)=1+x+x^6$, was utilized to derive the above scrambling pattern but any method of deriving a scrambling pattern may be utilized by exemplary embodiments of the present invention. In addition, the scrambling pattern may be a different length (e.g., thirty-two bits or one hundred and twenty-eight bits) than the one shown above.

Applying an XOR to the input data and the scrambling pattern results in scrambled data for transmission to a receiving side. An XOR is then applied to the scrambled data and the same bits in the scrambling pattern resulting in the original input data. In the following example, the scrambling pattern is as shown above, the scrambling pointer has a value of nine and the input data is equal to "0000." The scrambled data is created by applying an XOR to "0011" (the ninth through twelfth bit in the scrambling pattern) and "0000" (the input data), resulting in the scrambled data value of "0011". After the data is transmitted to the receiving side, it is de-scrambled by applying an XOR to "0011" (the scrambled data value) and "0011" (the ninth through twelfth bit in the scrambling pattern), resulting in the input data value of "0000."

Exemplary embodiments of the present invention may be utilized to decrease the likelihood that data transmitted across the memory subsystem bus will not switch. This can be performed without impacting bandwidth or requiring system operation to be halted by using a scrambling pattern. Another advantage of the scrambling approach is that the logic and additional latency required to implement scrambling within the memory subsystem is relatively small.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing bus recalibration, the method comprising:
receiving input data at a transmit side, the transmit side including a memory controller or a memory module within a cascaded interconnect memory system;
scrambling values of the input data at the transmit side resulting in scrambled data, the scrambling including mixing values of data bits in the input data with a known pattern designed to reduce the likelihood that the data values will not switch within a selected number of bits and provides transitions to determine an optimum phase for data sampling at a receive side;

transmitting the scrambled data to the receive side via a memory bus, the receive side including an other memory controller or memory module within the memory system, and the receive side directly connected to the transmit side by a packetized multi-transfer interface via the memory bus;

periodically synchronizing a sampling clock and a data phase of the scrambled data at the receive side for the data sampling on the memory bus; and de-scrambling the scrambled data at the receive side resulting in the input data.

2. The method of claim 1 wherein the synchronizing includes determining a phase of the sampling clock for the data sampling on the memory bus.

3. The method of claim 1 wherein the synchronizing includes adjusting a phase of the sampling clock so that it is centered between two consecutive edges of the scrambled data on the memory bus.

4. The method of claim 1 wherein the scrambling and the de-scrambling are synchronized between the transmit side and the receive side.

5. The method of claim 1 wherein input to the scrambling and the de-scrambling includes a scrambling pattern.

6. The method of claim 1 wherein the scrambling and the de-scrambling are synchronized at system initialization.

7. The method of claim 1 wherein the scrambling and the de-scrambling are synchronized periodically during system operation.

8. The method of claim 1 wherein the memory modules operate at a memory module data rate and the memory bus operates at four times the memory module data rate.

9. The method of claim 1 wherein the mixing applies an exclusive-or (XOR) function to the values of the data bits in the input data and the known pattern, and a pointer value is synchronized between the transmit side and the receive side to index into a scrambling pattern to point to a bit in the scrambling pattern to determine the known pattern.

10. A cascaded interconnect system comprising:
one or more memory modules;
a memory controller;
a memory bus that utilizes periodic recalibration, wherein the memory modules and the memory controller are directly interconnected by a packetized multi-transfer interface via the memory bus and provide scrambled data for use in the periodic recalibration, the scrambled data generated by mixing values of data bits on the memory bus with a known pattern designed to reduce the likelihood that the data values will not switch within a selected number of bits and provides transitions to determine an optimum phase for data sampling; and
a sampling clock, wherein the periodic recalibration includes synchronizing the sampling clock and a data phase of the scrambled data for the data sampling on the memory bus.

11. The system of claim 10 wherein the periodic recalibration includes adjusting the sampling clock so that it is centered between two consecutive edges of data on the memory bus.

12. The system of claim 10 wherein the memory bus includes a segment providing a connection between one of the memory modules and the memory controller or between two of the memory modules, the segment including a transmit side where scrambling is performed on input data resulting in scrambled data and a receive side where de-scrambling is performed on the scrambled data resulting in the input data.

13. The system of claim 12 further comprising circuitry for performing the scrambling and the de-scrambling.

14. The system of claim 12 wherein the scrambling and the de-scrambling are synchronized between the transmit side and the receive side.

15. The system of claim 12 wherein input to the scrambling and the de-scrambling includes a scrambling pattern.

16. The system of claim 12 wherein the scrambling and the de-scrambling are synchronized at system initialization.

17. The system of claim 12 wherein the scrambling and the de-scrambling are synchronized periodically during system operation.

18. The system of claim 10 wherein the memory modules operate at a memory module data rate and the memory bus operates at four times the memory module data rate.

19. The system of claim 10 wherein the memory bus includes an upstream memory bus and a downstream memory bus.

20. A storage medium encoded with machine readable computer program code for providing bus recalibration, the storage medium including instructions for causing a computer to implement a method comprising:

receiving input data at a transmit side, the transmit side including a memory controller or a memory module within a cascaded interconnect memory system;

scrambling values of the input data at the transmit side resulting in scrambled data, the scrambling including mixing values of data bits in the input data with a known pattern designed to reduce the likelihood that the data values will not switch within a selected number of bits and provides transitions to determine an optimum phase for data sampling at a receive side;

transmitting the scrambled data to the receive side via a memory bus, the receive side including an other memory controller or memory module within the memory system, and the receive side directly connected to the transmit side by a packetized multi-transfer interface via the memory bus;

periodically synchronizing a sampling clock and a data phase of the scrambled data at the receive side for the data sampling on the memory bus; and de-scrambling the scrambled data at the receive side resulting in the input data.

* * * * *